United States Patent
Fritz

(10) Patent No.: US 11,545,800 B2
(45) Date of Patent: Jan. 3, 2023

(54) METHOD FOR CONNECTING TWO MINERAL-INSULATED CABLES, ARRANGEMENT HAVING TWO MINERAL-INSULATED CABLES JOINED TO ONE ANOTHER, AND ALSO CABLE, SHAPED ELEMENT AND JOINING KIT FOR JOINING TWO CABLES

(71) Applicant: Schott AG, Mainz (DE)

(72) Inventor: Oliver Wolfgang Fritz, Obersüssbach (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 17/236,498

(22) Filed: Apr. 21, 2021

(65) Prior Publication Data
US 2021/0328398 A1    Oct. 21, 2021

(30) Foreign Application Priority Data
Apr. 21, 2020   (DE) .................... 10 2020 110 830.3

(51) Int. Cl.
*H01R 4/02* (2006.01)
*H01R 43/02* (2006.01)

(52) U.S. Cl.
CPC ............ *H01R 43/02* (2013.01); *H01R 4/022* (2013.01)

(58) Field of Classification Search
CPC . H01R 4/02; H01R 4/022; H01R 9/24; H01R 9/223; H01R 43/02; H02G 3/06; H02G 15/08; E21B 34/10; E21B 19/16; E21B 41/00; H01B 3/10; H01B 3/105; H01B 7/24

USPC ............ 174/74 R, 75 C, 84 R, 88 C, 91–93, 174/102 R, 105 R, 106 R; 29/829, 872, 29/873; 166/65.1, 169, 242.3, 242.6, 373, 166/380; 439/578, 874, 886
See application file for complete search history.

(56) References Cited

U.S. PATENT DOCUMENTS

| | | | |
|---|---|---|---|
| 3,787,607 A | | 1/1974 | Schlafly |
| 3,818,123 A | * | 6/1974 | Maltz .................... H01R 4/723 228/56.3 |
| 4,317,003 A | * | 2/1982 | Gray .................... G02B 6/4416 174/105 R |

(Continued)

FOREIGN PATENT DOCUMENTS

| | | |
|---|---|---|
| DE | 2316053 | 10/1973 |
| DE | 29 36 628 C2 | 12/1981 |
| GB | 1076880 | 7/1967 |

*Primary Examiner* — William H. Mayo, III
(74) *Attorney, Agent, or Firm* — Taylor IP, P.C.

(57) ABSTRACT

A method for joining a first cable to a second cable that each include at least one electrically conductive inner conductor, an outer sheath which at least partially surrounds the at least one inner conductor, and an insulation material which is arranged at least partially between the at least one inner conductor and the outer sheath. The method includes: bringing an end of each cable together such that at least one inner conductor of the cables are opposite one another and a fusible conductor joining material having a lower melting point than the at least one inner conductor is present in between; and heating at least one of the cables from the outside such that the heat penetrates into an interior of the at least one heated cable so the fusible conductor joining material melts and electrically connects the at least one inner conductor of the cables to one another.

20 Claims, 10 Drawing Sheets

(56) References Cited

U.S. PATENT DOCUMENTS

| | | | | |
|---|---|---|---|---|
| 4,580,874 | A | * | 4/1986 | Winter ................. G02B 6/2558 |
| | | | | 264/36.19 |
| 5,167,545 | A | * | 12/1992 | O'Brien ................. H01R 4/723 |
| | | | | 439/578 |
| 6,123,556 | A | | 9/2000 | Asakura et al. |
| 7,216,719 | B2 | * | 5/2007 | Ahmed ................. B23K 20/004 |
| | | | | 166/242.6 |
| 2003/0062157 | A1 | * | 4/2003 | Ahmed ................. H01R 4/029 |
| | | | | 166/242.6 |
| 2003/0192707 | A1 | * | 10/2003 | Guven ................. E21B 17/028 |
| | | | | 166/242.6 |

\* cited by examiner

METHOD FOR CONNECTING TWO MINERAL-INSULATED CABLES, ARRANGEMENT HAVING TWO MINERAL-INSULATED CABLES JOINED TO ONE ANOTHER, AND ALSO CABLE, SHAPED ELEMENT AND JOINING KIT FOR JOINING TWO CABLES

CROSS REFERENCE TO RELATED APPLICATIONS

This application claims priority to German Patent Application No. DE 10 2020 110 830.3 filed on Apr. 21, 2020, which is incorporated in its entirety herein by reference.

BACKGROUND OF THE INVENTION

1. Field of the Invention

The invention relates to a method for joining a mineral-insulated cable to a further mineral-insulated cable or a connector, an arrangement comprising a mineral-insulated cable which is joined to a further mineral-insulated cable or a connector, and also a cable or a connector, a corresponding shaped element and a kit for joining two cables or a cable to a connector.

2. Description of the Related Art

Mineral-insulated cables (MI cables) are used in extreme environmental conditions, e.g. at high temperatures, high pressures, in the presence of radioactive radiation and/or corrosive influences, and generally wherever aging of the cable is to be avoided. Examples which may be mentioned are facilities in the deep sea, for example in a petroleum and/or natural gas drilling or exploration facility, and/or in chemically stressed or radiation-stressed environments, for example in the chemical industry or in energy plant engineering and reactor engineering, in particular in explosion hazard areas, in an energy generation or energy storage facility having a housing, or in an encapsulation of an energy generation facility or an energy storage facility or a reactor or a storage facility for toxic and/or hazardous materials, e.g. including small modular reactors (SMR), nuclear reactors, oil and gas transport under water, pipelines, hot cells, high-temperature processes.

Mineral-insulated cables (MI cables) have in principle three components: an electric conductor, e.g. composed of copper or, particularly in the case of thermocouples, of nickel/copper-nickel alloy (Ni/CuNi) etc., also a cable sheath, typically in the form of a metallic tube, e.g. composed of stainless steel, Inconel, copper, etc., and also an insulator which is located in between and is composed of a compacted ceramic powder, e.g. MgO, $SiO_2$, etc.

There are various splicing methods for joining two MI cables or for joining an MI cable to a plug. These are generally based on welding or hard soldering, especially in order to create a mechanically strong splice which is gastight and thermally highly stable.

Referring to FIG. 1, a known splicing method for joining two MI cables 10, 10' provides, for example, for the outer sheath 12, 12' composed of stainless steel to be mechanically cut at the ends to be joined of the two cables and for the compacted insulator to be removed, so that the copper conductors 11, 11' of both cables are exposed. A sleeve 17 having a hole 17L is then pushed over one cable end. The two exposed copper conductors 11, 11' are then soldered to one another, the sleeve 17 is pushed over the exposed, soldered conductors and hard-soldered at both ends to the sheathing tubes 12, 12' of the MI cables to be joined. The empty volume in the sleeve is refilled with insulator powder through the hole 17L in the sleeve and compacted by vibration and the hole 17L in the sleeve is finally closed by hard solder.

However, this method has the disadvantage that carrying out the steps indicated is relatively cumbersome and time-consuming. This is especially problematical at difficult-to-access places or under environmental conditions which do not allow a long residence time, e.g. at high temperature, in the presence of radioactive radiation, etc. When, in particular, the insulator consists of powder and/or is hygroscopic, an excessively long period of time can also lead to a decrease in the insulation resistance on the open cable. Other splicing methods also often have the disadvantage that they do not ensure a hermetic connection.

What is needed in the art is way to join two cables or a cable to a plug, which is very simple and quick to carry out, e.g. in order to avoid intrusion of moisture into the insulator or to allow quick joining under difficult conditions. In particular, what is needed in the art is a way to provide a joining method which ensures a hermetic splice.

SUMMARY OF THE INVENTION

In some exemplary embodiments provided according to the invention, a method for joining a first cable to a second cable is provided. The first cable and the second cable each include at least one electrically conductive inner conductor for transmitting electric signals or electric energy, an outer sheath which at least partially surrounds the at least one inner conductor, and an insulation material which is arranged at least partially between the at least one inner conductor and the outer sheath in order to insulate the at least one inner conductor from the outer sheath. The method includes: providing an electrically conductive fusible conductor joining material which has a lower melting point than that of the at least one inner conductor; bringing an end of the second cable to an end of the first cable such that at least one inner conductor of the first cable and the second cable are opposite one another and the fusible conductor joining material is present in between; and heating at least one of the first cable or the second cable from the outside such that the heat penetrates into an interior of the at least one heated cable so that the fusible conductor joining material present between the at least one inner conductor of the first cable and the second cable melts and electrically connects the at least one inner conductor of the first cable and the second cable to one another.

In some exemplary embodiments provided according to the invention, an arrangement includes: a first cable including at least one electrically conductive inner conductor for transmitting electric signals or electric energy, an outer sheath which at least partially surrounds the at least one inner conductor, and an insulation material which is arranged at least partially between the at least one inner conductor and the outer sheath in order to insulate the at least one inner conductor from the outer sheath; a second cable joined to the first cable, the second cable including at least one electrically conductive inner conductor for transmitting electric signals or electric energy, an outer sheath which at least partially surrounds the at least one inner conductor, and an insulation material which is arranged at least partially between the at least one inner conductor and the outer sheath in order to insulate the at least one inner conductor from the outer sheath; and a conductor joining material which has been melted and resolidified to electrically connect the at least one inner conductor of the first cable to the at least one inner conductor of the second cable.

In some exemplary embodiments provided according to the invention, a cable includes: at least one electrically conductive inner conductor for transmitting electric signals or electric energy; an outer sheath which at least partially surrounds the at least one inner conductor; and an insulation material which is arranged at least partially between the at least one inner conductor and the outer sheath in order to insulate the at least one inner conductor from the outer sheath. The insulation material is absent at one end of the cable such that there is a free space between the at least one inner conductor and the outer sheath.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
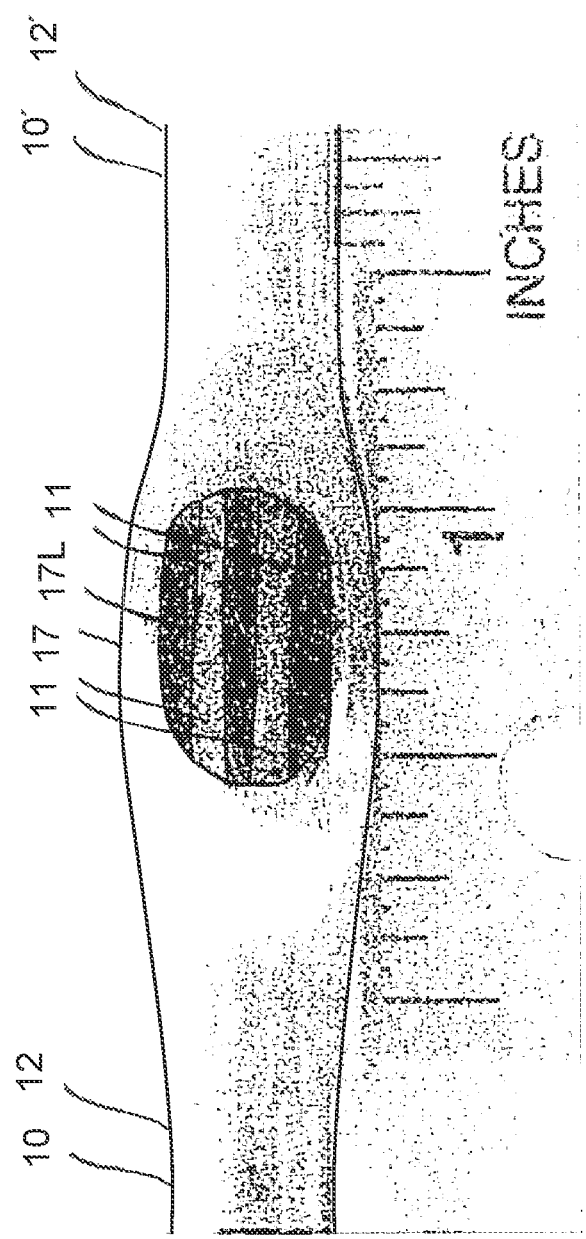
FIG. 1 shows a photograph of two known mineral-insulated cables with a sleeve having a hole placed over them.

Exemplary embodiments provided according to the invention disclose a method for joining a first, for example mineral-insulated, cable to a second, for example mineral-insulated, cable. The cables each comprise at least one electrically conductive inner conductor for transmitting electric signals or electric energy, additionally an, for example metallic, outer sheath which at least partially surrounds the at least one inner conductor and also an, for example mineral, insulation material which is arranged at least partly between the inner conductor and the outer sheath in order to insulate the inner conductor from the outer sheath.

In the method provided according to the invention, an electrically conductive, fusible conductor joining material which has a lower melting point than that of the inner conductor of the first cable and/or of the second cable is provided. The conductor joining material can, for instance, be provided as a piece of material, e.g. as a ball, platelet, etc., but also as, for example, paste.

Furthermore, in the method provided according to the invention, one end of the second cable is brought to one end of the first cable in such a way that the inner conductors of the two cables are opposite one another and the fusible conductor joining material is located in between. The second cable end can be brought, for example, in an axial direction to the first cable end until the end faces of the two inner conductors are opposite one another and come very close to one another except for, for example, a small spacing in which the conductor joining material is present. The two cable ends may be brought so close to one another that the two inner conductors come into contact with the conductor joining material at each of their end faces.

Furthermore, at least one of the cables is, in the method provided according to the invention, heated from the outside so that the fusible conductor joining material present between the two inner conductors melts and electrically connects the inner conductors of the two cables to one another. The conductor joining material may melt onto each of the end faces of the two inner conductors in order to join these. In some embodiments, both cables are heated from the outside, for example at the place at which the two cable ends which have been brought close together adjoin one another. For example, the heat applied to the cable from the outside is thus conducted inward through the cable so that the conductor joining material present in the interior between the two inner conductors melts. In other words, the heat applied from the outside to the cable goes only indirectly to the conductor joining material.

As a result, cutting the cable sheath at the cable ends in order to expose the inner conductors can be dispensed with. Furthermore, soldering the exposed inner conductors to one another from the outside can be dispensed with. The method provided according to the invention thus allows quick and simple joining of two cables. Particularly in the case of cables having a plurality of inner conductors, these can all be joined to one another simultaneously in the method provided according to the invention and do not need to be individually soldered to one another, as a result of which the method is simplified and accelerated further.

In some embodiments, a fusible sheath joining material is provided in addition to the conductor joining material. The sheath joining material can once again be provided as a piece of material, e.g. as a ring corresponding to the cross section of the cable sheath, but also as, for example, a paste. The sheath joining material may have a lower melting point than that of the outer sheath.

When a sheath joining material is provided, the end of the second cable can be brought to the end of the first cable such that the outer sheaths of the two cables are opposite one another and the fusible sheath joining material is present in between. In turn, the cable ends can, for example, be brought to one another such that the end faces of the two outer sheaths are opposite one another and come very close to one another except for, for example, a small spacing in which the sheath joining material is present. The two cable ends may be brought so close to one another that each of the end faces of the two outer sheaths come into contact with the sheath joining material.

Furthermore, the at least one cable is heated from the outside such that not only the conductor joining material but now also the fusible sheath joining material present between the two outer sheaths melts and joins the outer sheaths of the two cables to one another. This results in formation of a hermetic connection.

The cable ends of the two cables can, for example, be present as cable ends which have been simply cut off without the cable sheath having to be cut short and the inner conductors having to be exposed because accessibility of the inner conductors for direct heating thereof is not necessary due to the heat which penetrates indirectly into the interior. Accordingly, the end of the first cable and of the second cable may each be configured such that when the end of the second cable is brought to the end of the first cable, the inner conductors of the two cables and the outer sheaths of the two cables are each opposite one another at essentially the same distance from one another. The spacing between the inner conductors and the spacing between the outer sheaths may be each at the same axial position.

In some embodiments, the conductor joining material has a lower melting point than that of the sheath joining material.

In some embodiments, insulation material is removed at the end of the first cable, for example such that a free space is formed between the inner conductor and the outer sheath at the end of the first cable, before the end of the second cable is brought to the end of the first cable. This may result in a cable end having a common end point in the axial direction for the outer sheath and the inner conductor and a different, earlier end point for the insulation material.

After the insulation material at the end of the first cable has been removed, a shaped element, for example an electrically insulating shaped element, is then inserted into the free space of the first cable, with the shaped element, in some embodiments, having a shape complementary to the, for example annular, free space in order to fill this free space tightly and having a higher thermal conductivity than that of the insulation material which has been removed. The shaped element promotes the penetration of the heat which is applied from the outside to the cable in order to promote melting of the conductor joining material in the interior.

The shaped element may be inserted into the free space of the first cable such that a subregion thereof projects at the end of the first cable. After the shaped element has been inserted into the free space, it can accordingly project beyond the end point of the inner conductor and the outer sheath.

When the end of the second cable has been brought to the end of the first cable, the free space at the end of the second cable can be placed over the subregion of the shaped element projecting at the end of the first cable such that the shaped element goes into the free spaces of both cables. The shaped element can thus not only bring about better heat conduction into the interior of the cable but can also effect stabilization against bending of the two joined cables at the joining point.

In some embodiments, a pure stabilization element which has at least this stabilizing effect can also be provided instead of a shaped element.

Furthermore, the shaped element can be inserted into the free space of the first cable in such a way that the projecting subregion at the end of the first cable is smaller than the thickness of the conductor joining material, for example has half the thickness of the latter. In this case, a second shaped element can then be inserted into the free space of the second cable in such a way that the projecting subregion at the end of the second cable is once again smaller than the thickness of the conductor joining material, for example has half the thickness of the latter.

Particularly after the shaped element has been inserted into the free space of the first cable, the conductor joining material held by the projecting subregion of the shaped element can be placed at the end of the first cable. For example, it is possible to use a shaped element which has at least one through-hole in order to accommodate the at least one inner conductor. If the shaped element projects over the inner conductor at the end of the first cable, the conductor joining material can be inserted into the through-hole at the projecting subregion of the shaped element. When the end of the second cable is then brought to the end of the first cable, the conductor joining material can be pushed deeper into the through-hole by the inner conductor of the second cable, for example until it comes into contact with both inner conductors.

Furthermore, after the shaped element has been inserted into the free space of the first cable, the sheath joining material held by the projecting subregion of the shaped element may be placed at the end of the first cable. For example, an annular sheath joining material can be placed over the subregion of the shaped element projecting at the first cable end. When the end of the second cable is then brought to the end of the first cable, the sheath joining material can come into contact with the outer sheaths of both cables.

In some embodiments, an outer reinforcing element which additionally surrounds the joining point of the two cables is also present. Accordingly, before the end of the second cable is brought to the end of the first cable, a, for example tubular, reinforcing element can be pushed over the end of the first or second cable such that the reinforcing element surrounds the outer sheath of this cable. After the end of the second cable has been brought to the end of the first cable, the reinforcing element can then be pushed back again until it surrounds the outer sheath of both cables and for example also surrounds the sheath joining material. When the cable is heated from the outside, the sheath joining material can then melt onto the two outer sheaths and also onto the surrounding reinforcing element and thus join the two outer sheaths to one another and also join both outer sheaths to the surrounding reinforcing element.

In the method described, use may be made of, for example, cables in which the inner conductor of the first cable and/or second cable comprises or consists of one of the following materials: copper, a copper alloy, a thermocouple of the E, J, K, T, N type and/or the outer sheath of the first cable and/or second cable comprises or consists of one of the following materials: stainless steel, for example of the 300 and 400 series, alloy HR-160, 230, 718, 600, an Inconel alloy or Hastelloy and/or the insulation material of the first cable and/or second cable comprises or consists of one of the following materials: $MgO$, $SiO_2$, $Al_2O_3$.

Furthermore, the method described may be carried out using, for example, a conductor joining material which comprises or consists of one of the following materials: a copper-silver alloy, an Ni-based alloy, a copper-based alloy or an alloy having a melting point below that of the inner conductor material and/or a sheath joining material which comprises or consists of one of the following materials: a copper-silver alloy, an Ni-based alloy, a copper-based alloy or an alloy having a melting point below that of the sheath material, and/or a shaped element which comprises or consists of one of the following materials: $Al_2O_3$, mullite, BN, $Si_3N_4$, $SiO_2$, AlN, $SiO_2$, $ZrO_2$, $HfO_2$.

Apart from the previously described method for joining two cables, the invention also provides an arrangement comprising a first, for example mineral-insulated, cable and a second, for example mineral-insulated, cable joined thereto, for example being produced or able to be produced by a method as described previously.

The arrangement accordingly provides for the inner conductors of the two cables to be electrically connected to one another by a conductor joining material which has been melted and resolidified.

Furthermore, the outer sheaths of the two cables may be joined to one another by a sheath joining material which has been melted and resolidified, with the inner conductors of the two cables and the outer sheaths of the two cables being able to have essentially the same spacing from one another, bridged by the respective joining material.

In addition, a, for example electrically insulating, shaped element may be arranged instead of the insulation material between the inner conductor and the outer sheath at the end of at least one of the cables, such as at the end of both cables, between the cables.

The outer sheaths of the two cables may also be surrounded by a reinforcing element which additionally surrounds the sheath joining material, with the melted and resolidified sheath joining material joining both the two outer sheaths and the reinforcing element to one another.

The invention further provides a, for example mineral-insulated, cable having at least one electrically conductive inner conductor for transmitting electric signals or electric energy, a, for example metallic, outer sheath which at least partially surrounds the at least one inner conductor and a, for example, mineral, insulation material which is arranged at least partially between the inner conductor and the outer sheath in order to insulate the inner conductor from the outer sheath, with insulation material being absent at one end of the cable, for example in such a way that there is a free space between the inner conductor and the outer sheath.

The end of the cable can be formed by cutting-off or sawing-off of the cable and subsequent removal of insulation material. The end of the cable may accordingly be configured so that the inner conductor and the outer sheath project for essentially the same distance.

A shaped element, for example an electrically insulating shaped element, may be arranged in the free space of the cable, with the shaped element having a complementary shape to the, for example annular, free space and accurately fitting and filling this free space and with the shaped element having a higher thermal conductivity than that of the insulation material.

A subregion of the shaped element can project at the end of the cable. In addition, conductor joining material and/or sheath joining material held by the projecting subregion of the shaped element can be arranged at the end of the cable.

The invention further provides a shaped element for arrangement in a, for example annular, free space at the end of a, for example mineral-insulated, cable, with, in some embodiments, the shaped element being electrically insulating and with the shaped element having a complementary shape to the free space in order to accurately fit and fill this free space.

The invention further provides a kit for joining a first, for example mineral-insulated, cable to a second, for example mineral-insulated, cable, where the kit comprises: a shaped element, a conductor joining material and, in some embodiments, a sheath joining material and also a reinforcing element.

Apart from the previously described method for joining two cables and the arrangement which can, for example, be produced accordingly and also the cable, the shaped element and the joining kit, the invention also provides a method for joining a, for example mineral-insulated, cable to a connector.

The cable used in this method once again comprises an electrically conductive inner conductor for transmitting electric signals or electric energy, a, for example metallic, outer sheath which at least partially surrounds the at least one inner conductor and a, for example mineral, insulation material which is arranged at least partially between the inner conductor and the outer sheath in order to insulate the inner conductor from the outer sheath.

The connector used in this method comprises at least one electrically conductive contact for transmitting electric signals or electric energy, such as a, for example metallic, sleeve which at least partially surrounds the at least one contact and also an insulation material, for example glass-comprising insulation material, which is arranged at least partially between the contact and the sleeve in order to insulate the contact from the sleeve. The connector has, for example, an end at which a cable can be connected.

In the method for joining a cable to a connector, and an electrically conductive fusible conductor joining material which has a lower melting point than that of the inner conductor and/or of the contact is provided.

Furthermore, an end of the cable is brought to an end of the connector such that the inner conductor of the cable is opposite the contact of the connector and the fusible conductor joining material is present in between.

In addition, the cable and/or the connector is heated from the outside such that the fusible conductor joining material present between the inner conductor and the contact melts and electrically connects the inner conductor of the cable and the contact of the connector with one another.

The method can be configured in a very similar way to the method for joining two cables. For example, the abovementioned features and method steps can also be employed for this method. In this case, the terms inner conductor and outer sheath of the second cable may have to be replaced by the terms contact and sleeve of the connector.

Once again, a fusible sheath joining material which has a lower melting point than that of the outer sheath and/or the sleeve can be provided.

Furthermore, the end of the cable may be brought to the end of the connector such that the outer sheath of the cable is opposite the sleeve of the connector and the fusible sheath joining material is present in between.

The cable and/or the connector can then be heated from the outside such that the fusible sheath joining material present between the outer sheath and the sleeve melts and joins the outer sheath of the cable and the sleeve of the connector to one another.

The end of the cable and the end of the connector may each be configured such that, when the end of the cable is brought to the end of the connector, the inner conductor and the contact and also the outer sheath and the sleeve are in each case opposite one another with an essentially equal spacing.

The conductor joining material can have a lower melting point than that of the sheath joining material.

In some embodiments, insulation material can be removed at the end of the cable, for example in such a way that a free space is formed between the inner conductor and the outer sheath at the end of the cable, before the end of the cable is brought to the end of the connector. The connector may already have an appropriate free space between the contact and the sleeve at its end configured for connection of the cable. However, it is also possible for the contact and/or the sleeve to be shortened so that the contact and the sleeve end at the same position.

After the insulation material has been removed at the end of the first cable, a shaped element, for example an electrically insulating shaped element, can be inserted into the free space of the first cable. As an alternative or in addition, such a shaped element can also be inserted into a free space between the contact and the sleeve at the end of the connector. The shaped element may have a greater thermal conductivity than that of the insulation material of the cable and/or of the connector.

The shaped element may be inserted into the free space of the cable and/or of the connector such that a subregion of the shaped element projects at the end of the first cable or of the connector.

Furthermore, when the end of the cable is brought to the end of the connector, the subregion of the shaped element projecting at the end of the cable may be inserted into the free space at the end of the connector and/or the free space at the end of the cable is placed over the subregion of the shaped element projecting at the end of the connector such that the shaped element goes both into the free space of the cable and also into the free space of the connector. The shaped element can thus also effect stabilization against kinking of the cable at the point of joining to the connector.

It is also possible for the shaped element to be inserted into the free space of the cable in such a way that the projecting subregion at the end of the cable is smaller than the thickness of the conductor joining material, for example has half the thickness of the latter. In this case, a second shaped element can correspondingly be inserted into the free space of the connector in such a way that the projecting subregion at the end of the connector is smaller than the thickness of the conductor joining material, for example has half the thickness of the latter.

After the shaped element has been inserted into the free space of the cable and/or of the connector, the conductor joining material held by the projecting subregion of the shaped element can be placed at the end of the cable and/or of the connector.

In addition, after the shaped element has been inserted into the free space of the cable and/or of the connector, the sheath joining material held by the projecting subregion of the shaped element can be placed at the end of the cable and/or of the connector.

In some embodiments, a reinforcing element is pushed over the end of the cable or of the connector in such a way that the reinforcing element surrounds the outer sheath of the cable or the sleeve of the connector before the end of the cable is brought to the end of the connector. After the end of the cable has been brought to the end of the connector, the reinforcing element may be pushed back again for such a distance that the reinforcing element surrounds both the outer sheath of the cable and the sleeve of the connector and surrounds the sheath joining material.

In the method described, use may be made of, for example, a cable in which the inner conductor of the cable comprises or consists of one of the following materials: copper, a copper alloy, a thermocouple of the E, J, K, T, N type and/or the outer sheath of the cable comprises or consists of one of the following materials: stainless steel, for example of the 300 and 400 series, alloy HR-160, alloy 230, alloy 718, alloy 600, a nickel-chromium alloy such as Inconel alloy, or a nickel-molybdenum alloy such as Hastelloy and/or the insulation material of the cable comprises or consists of one of the following materials: MgO, $SiO_2$, $Al_2O_3$.

In addition, the method described is, for example, carried out using a connector in which the contact of the connector comprises or consists of one of the following materials: an alloy of nickel-iron, nickel-cobalt-iron, iron-cobalt or Inconel and/or the sleeve of the connector comprises or consists of one of the following materials: steel, stainless steel, Inconel or Hastelloy and/or the insulation material of the connector comprises or consists of one of the following materials: glass, glass-ceramic or ceramic.

Furthermore, the method described is carried out using, for example, a conductor joining material which comprises or consists of one of the following materials: a copper-silver alloy, an Ni-based alloy, a copper-based alloy or an alloy having a melting point below that of the inner conductor and/or a sheath joining material which comprises or consists of one of the following materials: a copper-silver alloy, an Ni-based alloy, a copper-based alloy or an alloy having a melting point below that of the sheath material and/or a shaped element which comprises or consists of one of the following materials: $Al_2O_3$, mullite, BN, $Si_3N_4$, $SiO_2$, AlN, $ZrO_2$, $HfO_2$.

Apart from the above-described method for joining a cable to a connector, the invention also provides an arrangement comprising a, for example mineral-insulated, cable and a connector joined thereto, for example being produced or able to be produced by a method as described previously.

The arrangement accordingly provides for the inner connector of the cable and the contact of the connector to be electrically connected to one another by a conductor joining material which has been melted and resolidified.

Furthermore, the outer sheath of the cable and the sleeve of the connector may be joined to one another by a sheath joining material which has been melted and resolidified, with the inner conductor and the contact and also the outer sheath and the sleeve to have an essentially equal spacing from one another, bridged by the respective joining material.

In addition, a shaped element, for example an electrically insulating shaped element, may be arranged instead of the insulation material between the inner conductor and the outer sheath at the end of the cable, such as at the end of the cable and at the end of the connector, between the cable and the connector.

Furthermore, the outer sheath of the cable and the sleeve of the connector may be surrounded by a reinforcing element which also surrounds the sheath joining material, with the melted and resolidified sheath joining material joining both the outer sheath and also the sleeve and also the reinforcing element to one another.

The invention further provides a connector comprising at least one electrically conductive contact for transmitting electric signals or electric energy, a, for example metallic, sleeve which at least partially surrounds the at least one contact and a, for example glass-comprising, insulation material, which is arranged at least partially between the contact and the sleeve in order to insulate the contact from the sleeve, with insulation material being absent at one end of the connector, for example such that a free space is formed between the contact and the sleeve, and with a, for example electrically insulating, shaped element, being arranged in the free space of the connector.

The shaped element may have a complementary shape to the, for example annular, free space and accurately fits and fills this free space. Furthermore, the shaped element may have a higher thermal conductivity than that of the insulation material.

A subregion of the shaped element can project at the end of the connector. Furthermore, conductor joining material and/or sheath joining material held by the projecting subregion of the shaped element can be arranged at the end of the connector.

The invention further provides a shaped element for arrangement in a, for example annular, free space at the end of a connector, where the shaped element may be electrically insulating and the shaped element may have a complementary shape to the free space in order to accurately fit and fill this free space.

Finally, the invention also provides a kit for joining a first, for example mineral-insulated, cable to a connector, wherein the kit comprises: a shaped element, a conductor joining material and, in some embodiments, a sheath joining material and also a reinforcing element.

Figure 2:
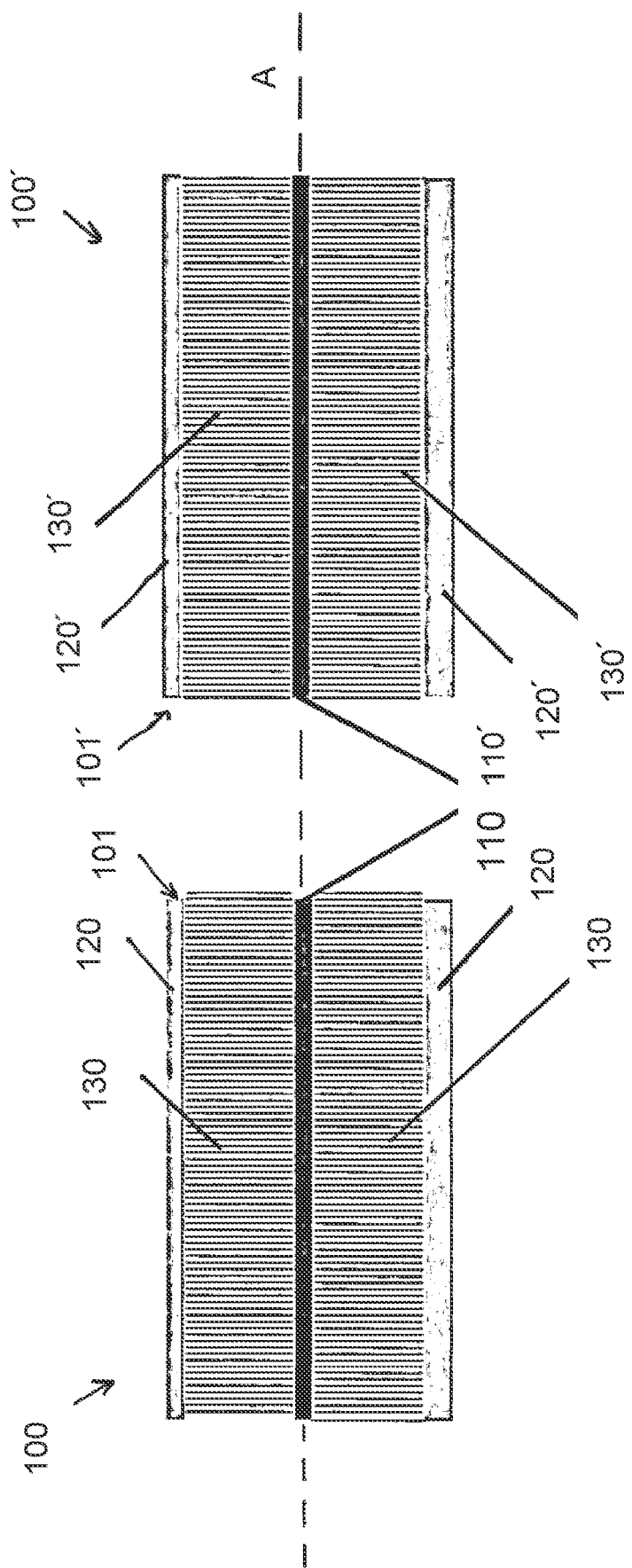
FIG. 2 shows a cross section through two mineral-insulated cables provided according to the invention.

Referring now to the drawings, FIG. 2 shows two mineral-insulated cables 100, 100' (MI cables) provided according to the invention which each comprise an electrically conductive inner conductor 110, 110', with the inner conductors each being surrounded by an outer sheath 120, 120' composed of stainless steel and a compacted ceramic powder being present as insulation material 130, 130' between the inner conductors 110, 110' and the outer sheaths 120, 120'. In the example shown, the two mineral-insulated cables 100, 100' have an identical structure.

The two cables 100, 100' each have an end 101, 101', which can have arisen by cutting off the cable, i.e., for example, can be configured as a parted end or cut end. The ends 101, 101' of the two cables 100, 100' are therefore such that the inner conductor 110, the outer sheath 120 and the insulation material 130 of the cable 100 end at the same end point along the axial direction A; the same applies to cable 100'.

Figure 3:
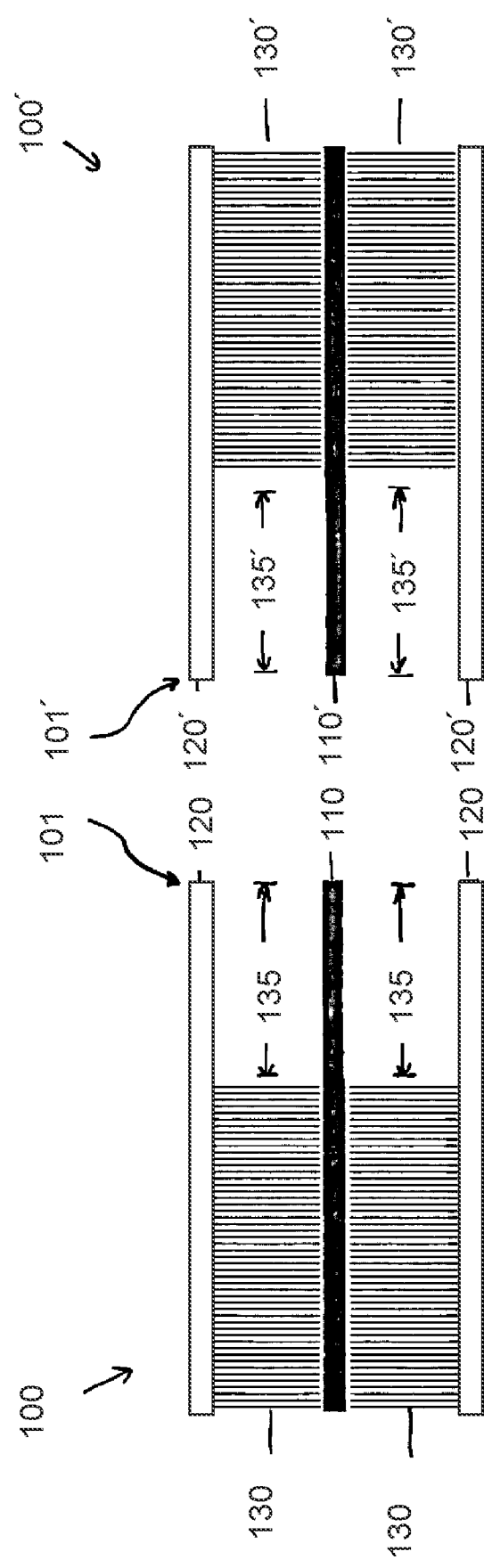
FIG. 3 shows a cross section through two mineral-insulated cables provided according to the invention, with a free space being formed at cable ends by removal of insulation materials.

The two MI cables 100, 100' are then to be joined at their ends 101, 101' in order to form a cable splice. As can be seen in FIG. 3, the insulation material 130, 130' is for this purpose removed at the cable ends 101, 101' such that a free space 135 extending into the cable is formed between the inner conductor 110, 110' and the outer sheath 120, 120' at each of the cable ends to be joined.

Figure 4:
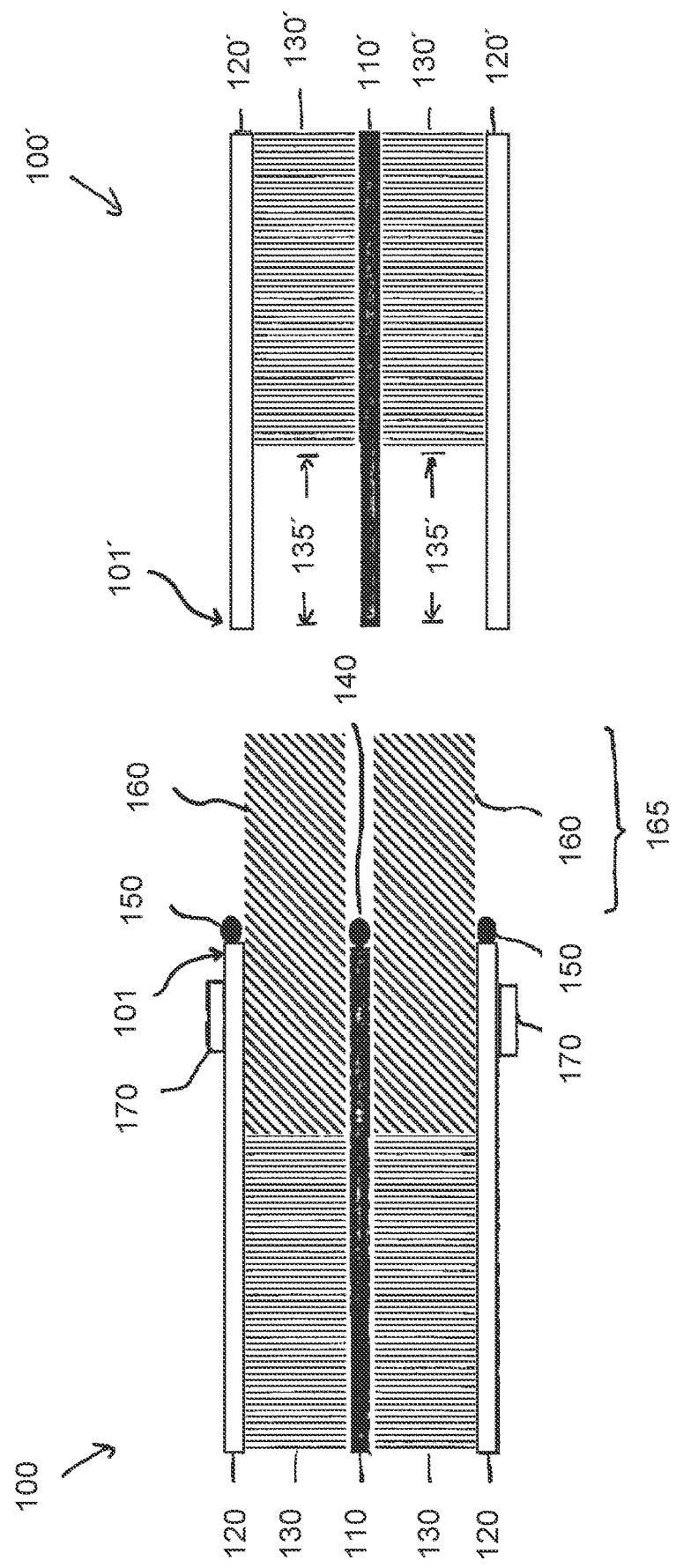
FIG. 4 shows a cross section through two mineral-insulated cables provided according to the invention, with a shaped element having been inserted into a free space of the first cable and conductor joining material and also sheath joining material having been positioned.

As shown in FIG. 4, a shaped element 160 configured as an aluminum oxide insulator and having a through-hole for the inner conductor is introduced into the free space 135 of one of the cables, here the first cable 100. However, in some embodiments the shaped element 160 is not inserted completely but instead has a subregion 165 projecting at the cable end 101.

Furthermore, a conductor joining material 140 and a sheath joining material 150, in each case configured as a shaped hard solder part, are placed at the cable end 101, with the conductor joining material 140 being inserted into the through-hole of the shaped element and the sheath joining material 150, which is, for example, configured as a ring, is placed over the shaped element 160.

The shaped element 160 which is inserted into the free space 135 may have an insulation resistance in the region of the insulation material 130, which can, for example, be configured as compacted powder. The specific electrical resistance of the shaped element may be above $1 \times 10^{10}$ Ω·cm. The thermal conductivity of the shaped element 160 may be very high so that the inner conductor joining material 140 melts very quickly. As an example, the shaped element can comprise or consist of aluminum oxide (thermal conductivity: 20 W/m·K).

The conductor joining material 140 which is configured, for example, as a hard solder preform and joins the inner conductors 110, 110' of the two cables (or joins the inner conductor to a plug contact, see further below) can have various shapes, e.g. the shape of a pellet or of a sleeve, etc. Furthermore, it is also possible to use a paste in order to achieve a proper join having a low ohmic resistance. It is also possible to use a metal sleeve with an internal hard solder preform.

Before the two cable ends 101, 101' are brought together, an annular reinforcing element 170 is additionally pushed over the cable end of one of the cables, for example such that the reinforcing element 170 surrounding the outer sheath is flush therewith but is movable. The outer reinforcing element 170 can consist of the same material as the outer sheath 120, 120' of one of the cables, i.e., for example, of stainless steel. The reinforcing element is optional and serves, for example, to reinforce the join when large mechanical loads act on it.

Figure 5:
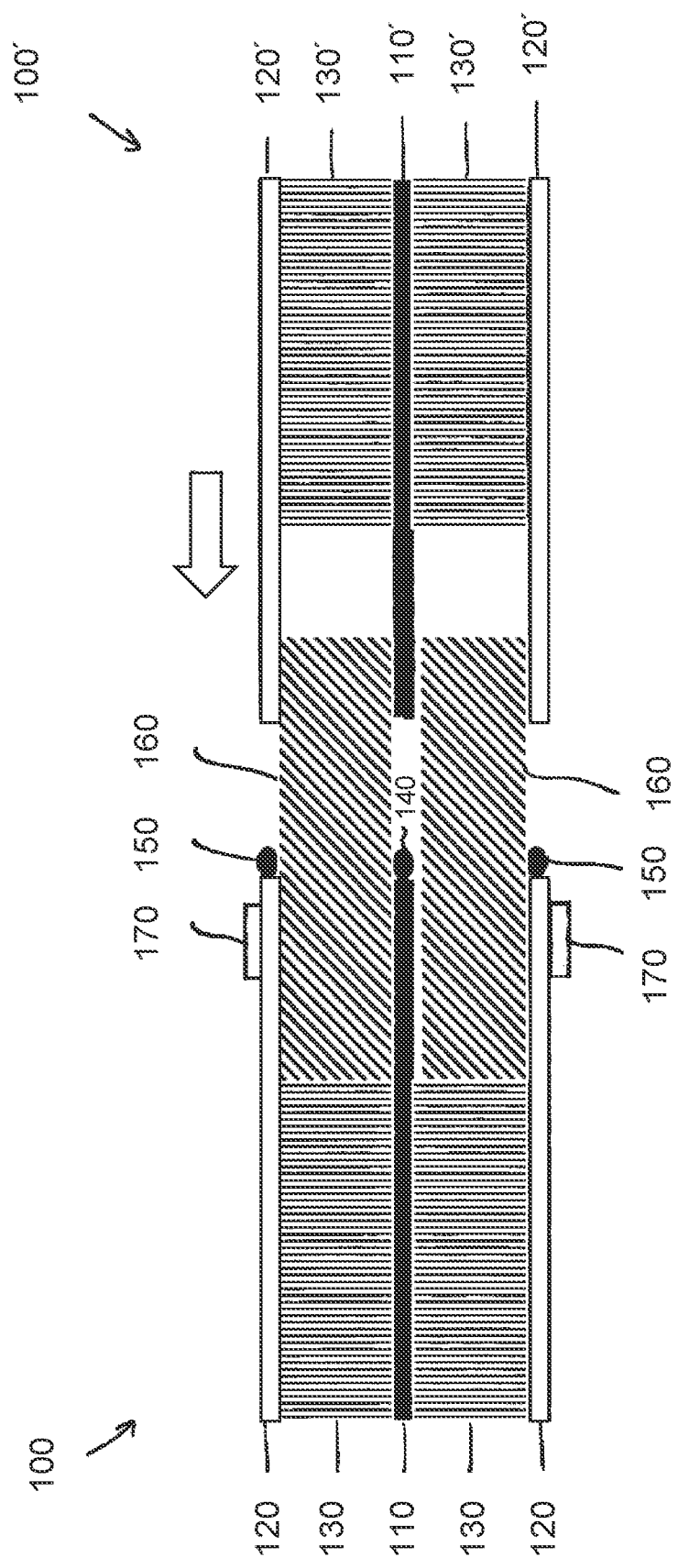
FIG. 5 shows a cross section through two mineral-insulated cables provided according to the invention, with a cable end of the second cable being brought to the cable end of the first cable.
Figure 6:
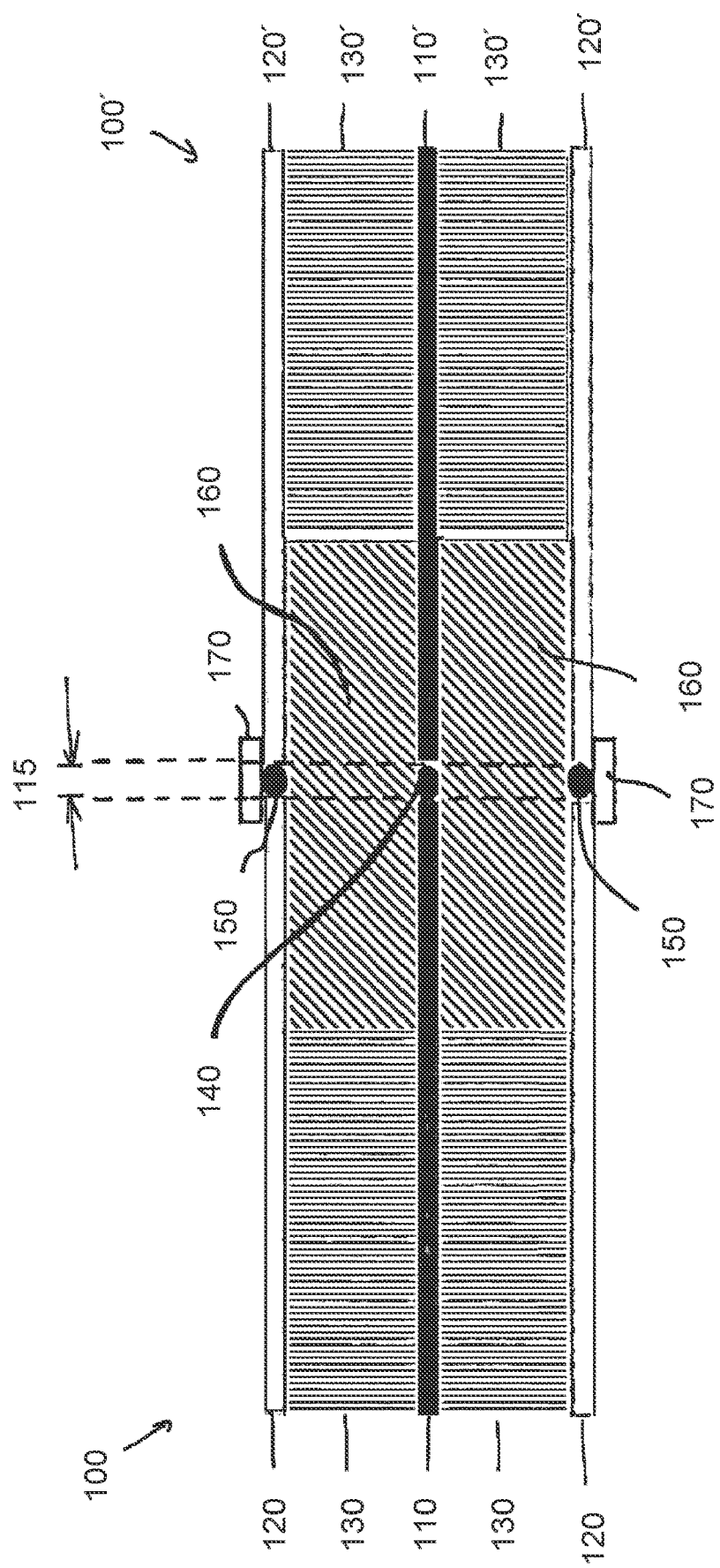
FIG. 6 shows a cross section through two mineral-insulated cables provided according to the invention, with the two cables being brought so close together that both cable ends come into contact with the conductor joining material and also the sheath joining material.

In FIG. 5, it can be seen how the second cable 100' is brought axially in the direction of the first cable 100. Here, the free space 135 present at the end 101' of the second cable 100' is placed over the projecting subregion 165 of the shaped element 160. As FIG. 6 shows, the second cable 100' is brought up to the first cable 100 until the two cable ends 101' and 101 are separated from one another only by a spacing 115 in which the conductor joining material 140 and sheath joining material 150 are present. The cables are accordingly brought together, for example, until the end faces facing the respective cable end 101', 101 of the two inner conductors 110, 110' touch the conductor joining material 140 and the end faces facing the respective cable end 101', 101 of the two outer sheaths 120, 120' touch the sheath joining material 150.

After the two cable ends 101, 101' have been brought together, the outer reinforcing element 170 is pushed back until it surrounds the two outer sheaths 120, 120' and the sheath joining material 150.

Figure 7:
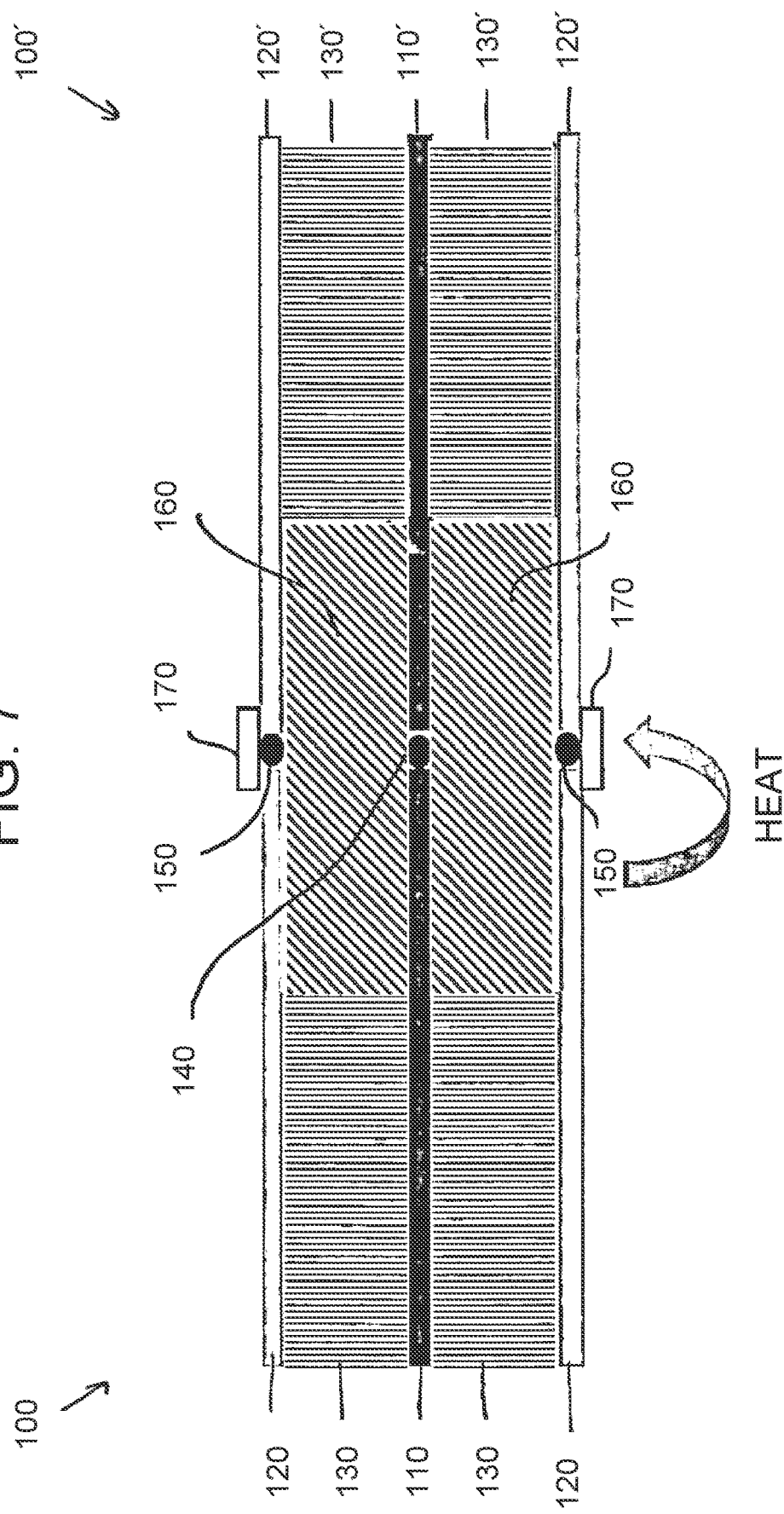
FIG. 7 shows a cross section through two mineral-insulated cables provided according to the invention, with the cables being heated from the outside.

As is shown in FIG. 7, the two cables are finally heated from the outside, e.g. by a flame, a soldering lamp or an HF coil. As a result, the sheath joining material 150 melts and joins the two outer sheaths 120, 120' to one another and to the reinforcing element 170. This forms a hermetic connection. The heat additionally penetrates into the interior of the cable, with the shaped element 160 promoting this process. As a result of the heat penetrating into the interior, the conductor joining material 140 also melts and joins the two inner conductors 110, 110' to one another.

Overall, preassembly and, by heating, a simultaneous joining of inner conductors and outer sheaths can be effected in a simple manner by the method described. The conductor joining material 140 and sheath joining material 150 can be configured as preshaped moldings or as paste and the shaped element can comprise or consist of aluminum oxide. In this respect, the method can also be carried out inexpensively.

Figure 8:
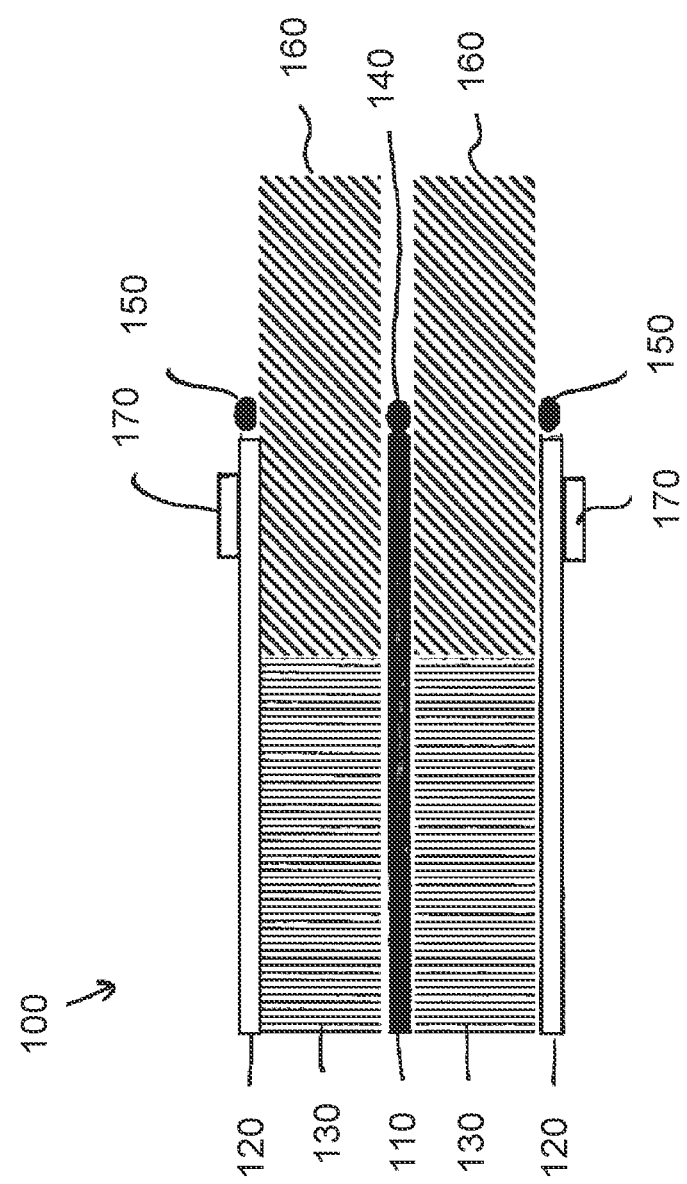
FIG. 8 shows a cross section through a mineral-insulated cable which is to be connected to a connector.
Figure 9:
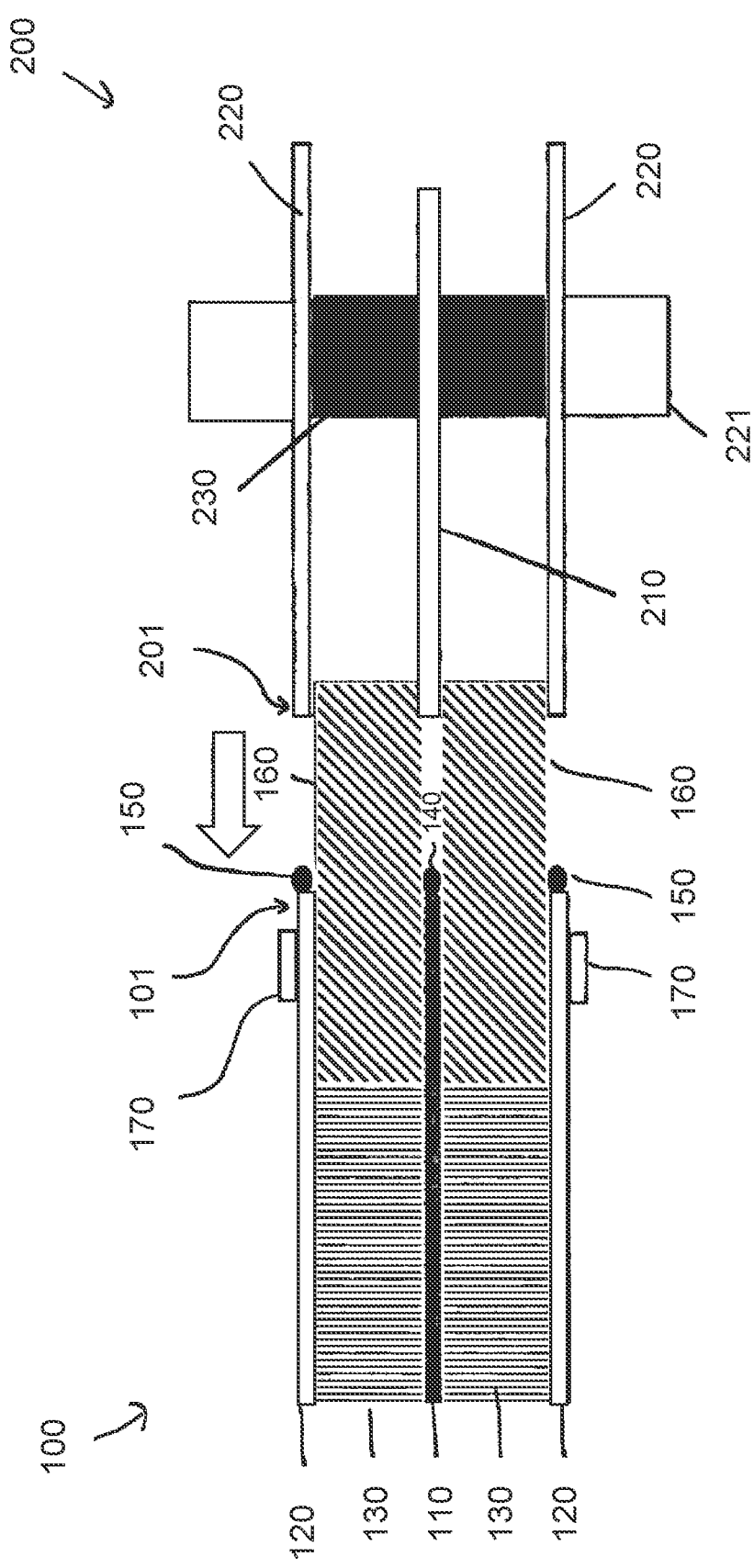
FIG. 9 shows a cross section through a mineral-insulated cable and a connector.
Figure 10:
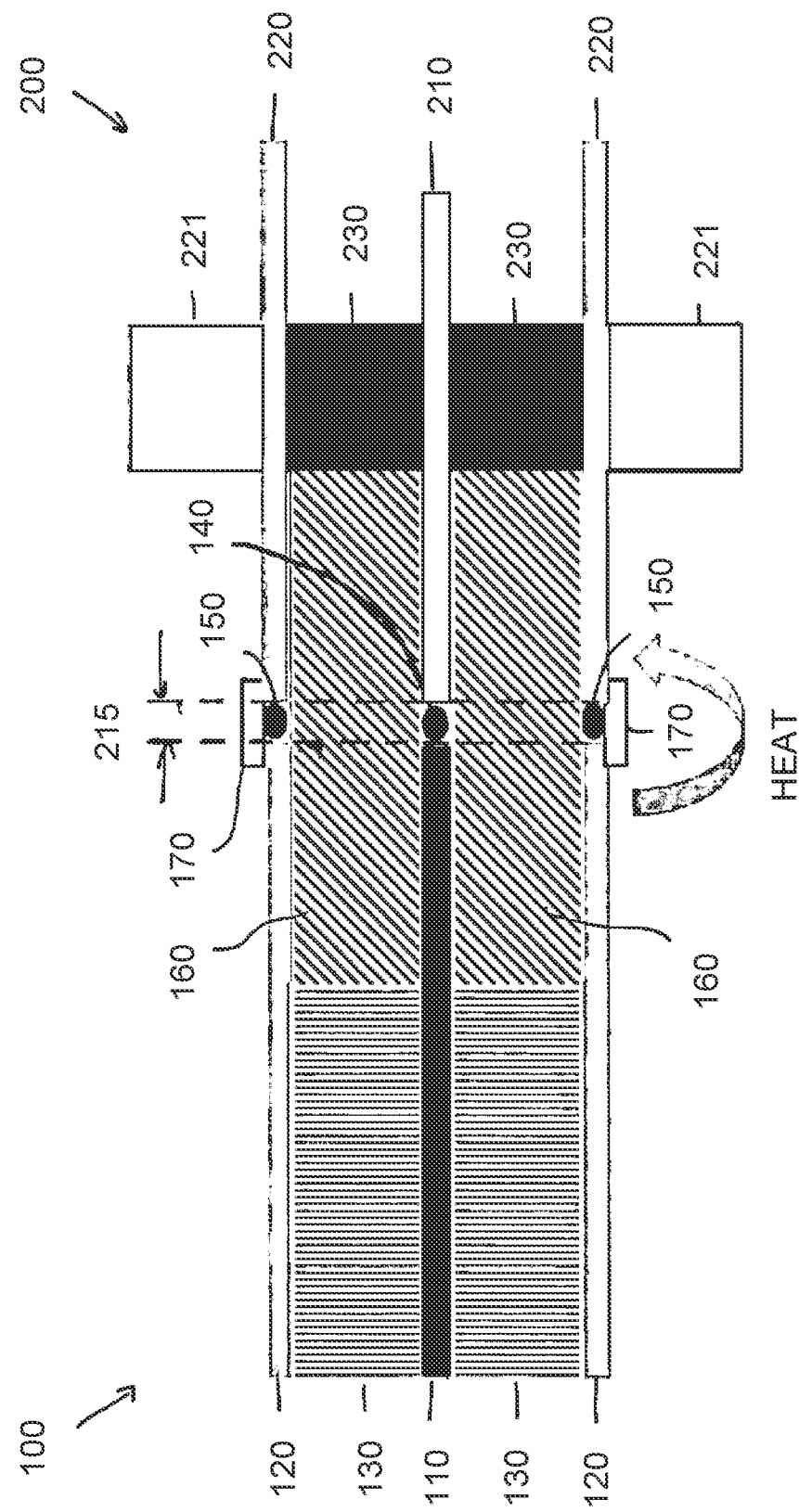
FIG. 10 shows a cross section through a mineral-insulated cable and a connector, with the cable and the connector being heated from the outside.

Referring to FIGS. 8-10, a cable 100 can also be joined to a connector 200. The connector comprises a contact 210, a surrounding sleeve 220 and an insulation material 230 which is located in between and can, for example, be composed of glass, glass-ceramic or ceramic.

Once again, insulation material 130 is firstly removed from the cable 100, a shaped element 160 is inserted, conductor joining material 140 and sheath joining material 150 are positioned and, optionally, a reinforcing ring 170 is installed. The connector can already have a free space between contact 210 and sleeve 220 from the beginning, so that removal of insulation material here can be dispensed with. As an alternative, the shaped element can also be inserted into this free space.

Cable 100 and connector 200 are then brought to one another until both the inner conductor 110 of the cable and the contact 210 of the connector come into contact with the conductor joining material 140 and both the outer sheath 120 of the cable and the sleeve 220 of the connector come into contact with the sheath joining material 150. As a result of heating, the joining materials 140, 150 melt and lead to the desired joint.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for joining a first cable to a second cable, the first cable and the second cable each comprising at least one electrically conductive inner conductor for transmitting electric signals or electric energy, an outer sheath which at least partially surrounds the at least one inner conductor, and an insulation material which is arranged at least partially between the at least one inner conductor and the outer sheath in order to insulate the at least one inner conductor from the outer sheath, the method comprising:
   providing an electrically conductive fusible conductor joining material which has a lower melting point than that of the at least one inner conductor;
   bringing an end of the second cable to an end of the first cable such that at least one inner conductor of the first cable and the second cable are opposite one another and the fusible conductor joining material is present in between; and
   heating at least one of the first cable or the second cable from the outside such that the heat penetrates into an interior of the at least one heated cable so that the fusible conductor joining material present between the at least one inner conductor of the first cable and the second cable melts and electrically connects the at least one inner conductor of the first cable and the second cable to one another.

2. The method of claim 1, further comprising:
   providing a fusible sheath joining material which has a lower melting point than that of the outer sheath;
   wherein the end of the second cable is brought to the end of the first cable such that the outer sheath of the first cable and the outer sheath of the second cable are opposite one another and the fusible sheath joining material is present in between and the at least one heated cable is heated from the outside so that the fusible sheath joining material present between the outer sheath of the first cable and the outer sheath of the second cable melts and joins the outer sheath of the first cable to the outer sheath of the second cable.

3. The method of claim 2, wherein at least one of the following is satisfied:
   the end of the first cable and the end of the second cable are each configured such that when the end of the second cable is brought to the end of the first cable, the at least one inner conductor of the first cable and the at least one inner conductor of the second cable and the outer sheath of the first cable and the outer sheath of the second cable are opposite one another, in each case with an essentially equal spacing; or
   the conductor joining material has a lower melting point than that of the sheath joining material.

4. The method of claim 1, further comprising removing insulation material at the end of the first cable in such a way that a free space is formed between the at least one inner conductor and the outer sheath at the end of the first cable before the end of the second cable is brought to the end of the first cable.

5. The method of claim 4, further comprising inserting a shaped element into the free space of the first cable after the insulation material has been removed at the end of the first cable.

6. The method of claim 5, wherein the shaped element has a complementary shape to the free space in order to accurately fit and fill the free space and the shaped element has a higher thermal conductivity than that of the insulation material.

7. The method of claim 5, further comprising removing insulation material at an end of the second cable in such a way that a free space is formed between the at least one inner conductor and the outer sheath at the end of the second cable, wherein the shaped element is inserted into the free space of the first cable in such a way that a subregion of the shaped element projects at the end of the first cable and, when the end of the second cable is brought to the end of the first cable, the free space at the end of the second cable is placed over the subregion of the shaped element projecting at the end of the first cable such that the shaped element goes into the free space of the first cable and the free space of the second cable.

8. The method of claim 7, further comprising inserting a second shaped element into the free space of the second cable in such a way that a projecting subregion at the end of the second cable is smaller than a thickness of the conductor joining material, wherein the shaped element is inserted into the free space of the first cable in such a way that the projecting subregion at the end of the first cable is smaller than a thickness of the conductor joining material.

9. The method of claim 5, wherein, after the shaped element has been inserted into the free space of the first cable, the conductor joining material held by the projecting subregion of the shaped element is placed at the end of the first cable and, after the shaped element has been inserted into the free space of the first cable, a sheath joining material held by the projecting subregion of the shaped element is placed at the end of the first cable.

10. The method of claim 5, wherein at least one of the following is satisfied:
   the conductor joining material comprises or consists of one of the following materials: a copper-silver alloy, an Ni-based alloy, a copper-based alloy or an alloy having a melting point below that of material of the at least one inner conductor;
   a sheath joining material comprises or consists of one of the following materials: a copper-silver alloy, an Ni-based alloy, a copper-based alloy or an alloy having a melting point below that of a material of the outer sheath; or the shaped element comprises or consists of one of the following materials: $Al_2O_3$, mullite, BN, $Si_3N_4$, $SiO_2$, AlN, $ZrO_2$, or $HfO_2$.

11. The method of claim 1, further comprising:

pushing a reinforcing element over the end of the first cable or the end of the second cable such that the reinforcing element surrounds the outer sheath of the respective cable before the end of the second cable is brought to the end of the first cable; and pushing back the reinforcing element for such a distance that the reinforcing element surrounds the outer sheath of the first cable and the outer sheath of the second cable after the end of the second cable has been brought to the end of the first cable.

12. The method of claim 1, wherein at least one of the following is satisfied:

the at least one inner conductor of at least one of the first cable or the second cable comprises or consists of one of the following materials: copper, a copper alloy, or a thermocouple of the E, J, K, T, or N type;

the outer sheath of at least one of the first cable or the second cable comprises or consists of one of the following materials: stainless steel, alloy HR-160, alloy 230, alloy 718, alloy 600, a nickel-chromium alloy, or a nickel-molybdenum alloy; or the insulation material of at least one of the first cable or the second cable comprises or consists of one of the following materials: MgO, $SiO_2$, or $Al_2O_3$.

13. The method of claim 1, wherein the heat penetrates through the outer sheath into the interior of the at least one heated cable so that the fusible conductor joining material present between the at least one inner conductor of the first cable and the second cable melts and electrically connects the at least one inner conductor of the first cable and the second cable to one another.

14. An arrangement comprising:

a first cable comprising at least one electrically conductive inner conductor for transmitting electric signals or electric energy, an outer sheath which at least partially surrounds the at least one inner conductor, and an insulation material which is arranged at least partially between the at least one inner conductor and the outer sheath in order to insulate the at least one inner conductor from the outer sheath;

a second cable joined to the first cable, the second cable comprising at least one electrically conductive inner conductor for transmitting electric signals or electric energy, an outer sheath which at least partially surrounds the at least one inner conductor, and an insulation material which is arranged at least partially between the at least one inner conductor and the outer sheath in order to insulate the at least one inner conductor from the outer sheath; and a conductor joining material present between the at least one inner conductor of the first cable and the at least one inner conductor of the second cable which has been melted and resolidified to electrically connect the at least one inner conductor of the first cable to the at least one inner conductor of the second cable.

15. A cable, comprising:

at least one electrically conductive inner conductor for transmitting electric signals or electric energy;

an outer sheath which at least partially surrounds the at least one inner conductor; and an insulation material which is arranged at least partially between the at least one inner conductor and the outer sheath in order to insulate the at least one inner conductor from the outer sheath, the insulation material being absent at one end of the cable such that there is a free space between the at least one inner conductor and the outer sheath, wherein the outer sheath completely annularly surrounds the free space between the at least one inner conductor and the outer sheath.

16. The cable of claim 15, wherein the end of the cable is configured such that the at least one inner conductor and the outer sheath project for essentially the same distance.

17. The cable of claim 15, further comprising a shaped element arranged in the free space.

18. The cable of claim 17, wherein the shaped element has a complementary shape to the free space and accurately fits and fills the free space and the shaped element has a higher thermal conductivity than that of the insulation material.

19. The cable of claim 18, wherein a subregion of the shaped element projects at the end of the cable.

20. The cable of claim 19, wherein at least one of the following is satisfied:

a conductor joining material held by the projecting subregion of the shaped element is arranged at the end of the cable; or the sheath joining material held by the projecting subregion of the shaped element is arranged at the end of the cable.

\* \* \* \* \*